(12) United States Patent
Bhide et al.

(10) Patent No.: US 9,726,071 B2
(45) Date of Patent: Aug. 8, 2017

(54) MULTI-STAGE TURBOCHARGED ENGINE

(71) Applicant: GENERAL ELECTRIC COMPANY, Schenectady, NY (US)

(72) Inventors: Shirish Bhide, Troy, MI (US); Trent A. Larson, Rochester, MI (US); Abhijeet Warale, Auburn Hills, MI (US); Gary Szuch, Oxford, MI (US); Pratap Subhash Shitole, Bangalore (IN); Jayesh Jain, Bangalore (IN); Vijayaselvan Jayakar, Bangalore (IN); Charles B. Atz, New Castle, PA (US); John Dowell, Grove City, PA (US); Aravind Kalavara, Bangalore (IN); Amit Kawatkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 715 days.

(21) Appl. No.: 14/140,852

(22) Filed: Dec. 26, 2013

(65) Prior Publication Data

US 2014/0182290 A1 Jul. 3, 2014

Related U.S. Application Data

(60) Provisional application No. 61/747,393, filed on Dec. 31, 2012.

(51) Int. Cl.
*F02B 33/44* (2006.01)
*F02B 37/007* (2006.01)
*F01N 13/18* (2010.01)
*F02B 37/00* (2006.01)
*F02B 37/013* (2006.01)
*F02B 37/18* (2006.01)

(52) U.S. Cl.
CPC ........ *F02B 37/007* (2013.01); *F01N 13/1816* (2013.01); *F02B 37/002* (2013.01); *F02B 37/013* (2013.01); *F02B 37/18* (2013.01); *Y02T 10/144* (2013.01)

(58) Field of Classification Search
CPC .. F01N 13/1816; F02B 37/002; F02B 37/007; F02B 37/013; F02B 37/18
See application file for complete search history.

(56) References Cited

U.S. PATENT DOCUMENTS 2,359,615 A * 10/1944 Browne ................ F02B 37/007
137/100
4,693,084 A * 9/1987 Ahrens ................ F02B 29/045
123/563

(Continued)

FOREIGN PATENT DOCUMENTS

EP 2 363 584 B1 7/2011

*Primary Examiner* — Jason Shanske
*Assistant Examiner* — Matthew T Largi
(74) *Attorney, Agent, or Firm* — Global Patent Operation; John A. Kramer

(57) ABSTRACT

An exhaust casing for use with a turbocharger includes a hollow body that has two mutually opposed large walls, which extend along first and second major dimensions of the hollow body and are spaced apart by a minor dimension of the hollow body, the hollow body defining a plenum and an inlet nozzle opening into the plenum along the minor dimension of the hollow body. The casing further includes an outlet nozzle opening from the plenum along one of the major dimensions of the hollow body.

19 Claims, 10 Drawing Sheets

(56) References Cited

U.S. PATENT DOCUMENTS

| | | | | |
|---|---|---|---|---|
| 5,117,782 | A * | 6/1992 | Bischoff | F02B 29/0481 123/1 A |
| 5,142,867 | A * | 9/1992 | Bergmann | F02B 41/10 60/612 |
| 5,692,378 | A * | 12/1997 | Ramsden | F02B 37/007 60/612 |
| 6,205,787 | B1 * | 3/2001 | Woollenweber | F02B 33/40 60/612 |
| 6,378,309 | B1 * | 4/2002 | Divecha | F01D 9/06 123/562 |
| 7,310,947 | B2 * | 12/2007 | Baumann | F02B 37/007 123/562 |
| 2013/0199162 | A1 | 8/2013 | Schlemmer-Kelling | |

* cited by examiner

|   | Distance from entry (mm) | Flow area (mm²) |
|---|---|---|
| A | 0 | 73,056 |
| B | 220 | 74,226 |
| C | 440 | 49,668 |
| D | 660 | 33,828 |
| E | 880 | 24,050 |
| F | Combined flow (exit) | 52,279 |

MULTI-STAGE TURBOCHARGED ENGINE

CROSS-REFERENCE TO RELATED APPLICATIONS

This application claims the benefit of U.S. Provisional Application Ser. No. 61/747,393, filed on Dec. 31, 2012, which is hereby incorporated by reference in its entirety.

BACKGROUND

Technical Field

Embodiments of the invention relate generally to internal combustion engines, and more particularly to turbocharged engines. Other embodiments relate to marine diesel engines with multi-stage turbocharger arrangements.

Discussion of Art

Ships typically carry two types of diesel engines: main propulsion engines and auxiliary engines. Both types of engine generate emissions of PM 2.5 (diesel soot), SO2 (sulfur dioxide), and NOx (nitrous oxides). Some governmental bodies, however, have adopted standards that will limit engine emissions, particularly NOx. For example, some of these standards apply to engines installed on U.S. vessels and to marine diesel fuels produced and distributed in the United States.

NOx emissions vary according to engine speed, combustion temperature, and the quantity of fuel burned. Lower speeds and higher combustion temperatures tend to raise the amount of NOx produced per quantity of fuel burned. As will be appreciated, low speed and high combustion temperature can be desirable characteristics of high-load internal combustion engines such as marine diesel propulsion engines. Therefore, the simplest path for reducing NOx emissions is to reduce the quantity of fuel burned per unit of useful power.

Turbochargers can be useful for enhancing fuel efficiency of piston-cylinder engines, by augmenting the mass and pressure of air inhaled into each cylinder during its intake stroke. However, turbochargers for marine diesel engines can be difficult to fit into the machinery space provided for the engines and their interfacing equipment.

As will be appreciated, it is desirable to minimize the machinery space within large ships, which are built to carry cargo. Therefore, it is desirable to provide a marine diesel turbocharger arrangement that satisfies revised emissions standards while not requiring excessive machinery space.

BRIEF DESCRIPTION

In embodiments, an exhaust casing includes a hollow body that has two mutually opposed large walls, which extend along first and second major dimensions of the hollow body and are spaced apart by a minor dimension of the hollow body. The hollow body defines a plenum. The exhaust casing also includes an inlet nozzle opening into the plenum along the minor dimension of the hollow body, and an outlet nozzle opening from the plenum along one of the major dimensions of the hollow body.

In embodiments, a compressor interstage duct is provided for combining flows of partly pressurized air. The duct includes a body defining an outlet chamber for connection to a high pressure compressor inlet, a first leg defining a first passage opening into the outlet chamber from a first inlet configured for connection to a first intercooler outlet, and a second leg defining a second passage opening into the outlet chamber from a second inlet configured for connection to a second intercooler outlet. The first and second inlets have a combined flow area that is greater than a flow area of the outlet chamber. Each leg has a flow area that gradually diminishes from the respective inlet to the place where the leg opens into the outlet chamber.

In embodiments, an engine includes an exhaust manifold and an intake manifold as well as a turbocharger apparatus connected between the exhaust manifold and the intake manifold. The turbocharger apparatus includes a high pressure turbocharger having a turbine configured to receive high pressure exhaust gas from the exhaust manifold and including a compressor configured to discharge high pressure intake air to the intake manifold as well as first and second low pressure turbochargers, each including a compressor configured to receive ambient air and to discharge low pressure air into the high pressure turbocharger via a compressor interstage duct, and each including a turbine configured to receive low pressure exhaust gas from the high pressure turbocharger via a turbine interstage duct and to release exhaust gas to a respective exhaust casing.

DRAWINGS

The present invention will be better understood from reading the following description of non-limiting embodiments, with reference to the attached drawings, wherein below:

Figure 4A:
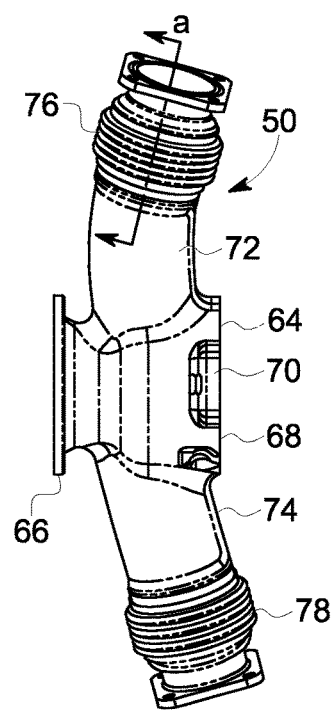
Figure 4B:
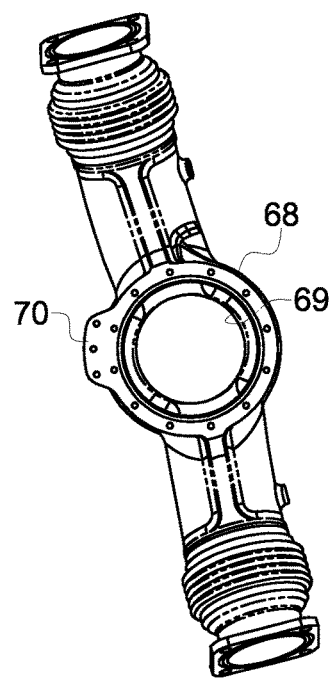
Figure 4C:
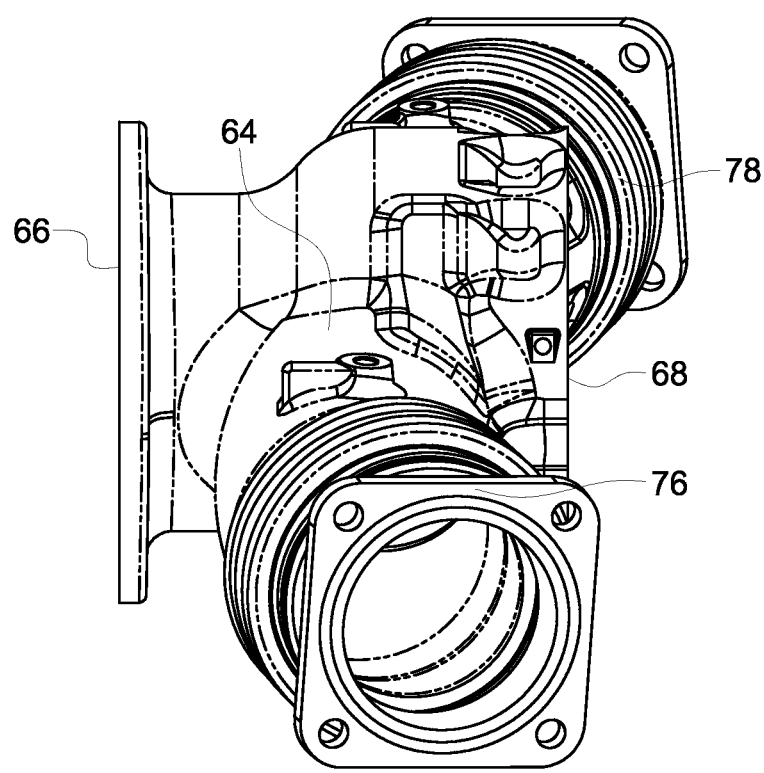
Figure 5A:
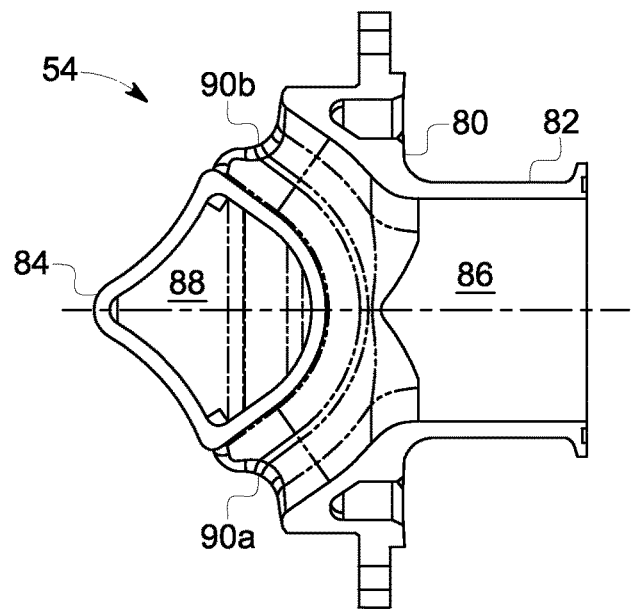
Figure 5B:
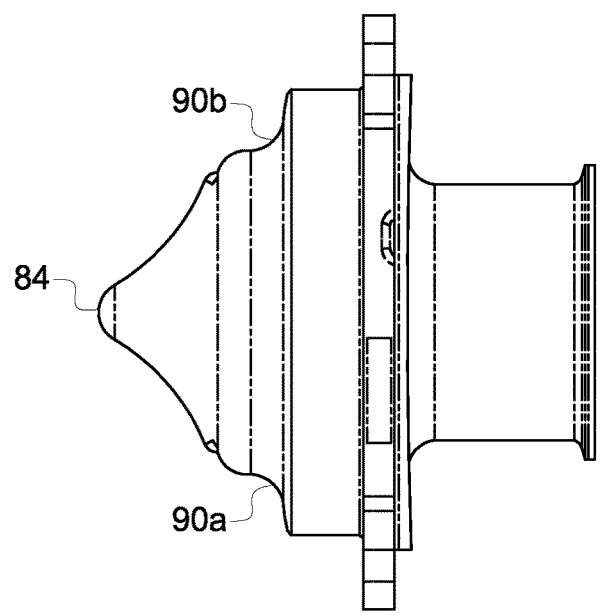
Figure 6:
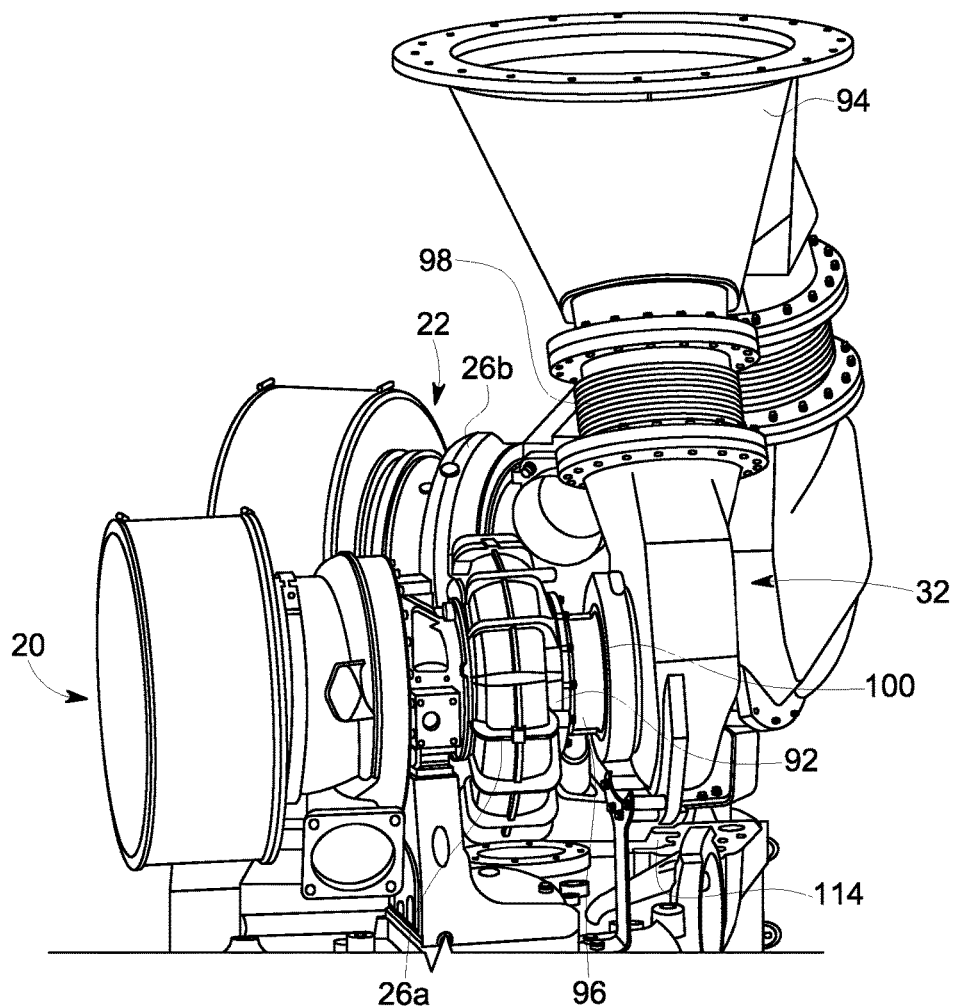
Figure 7:
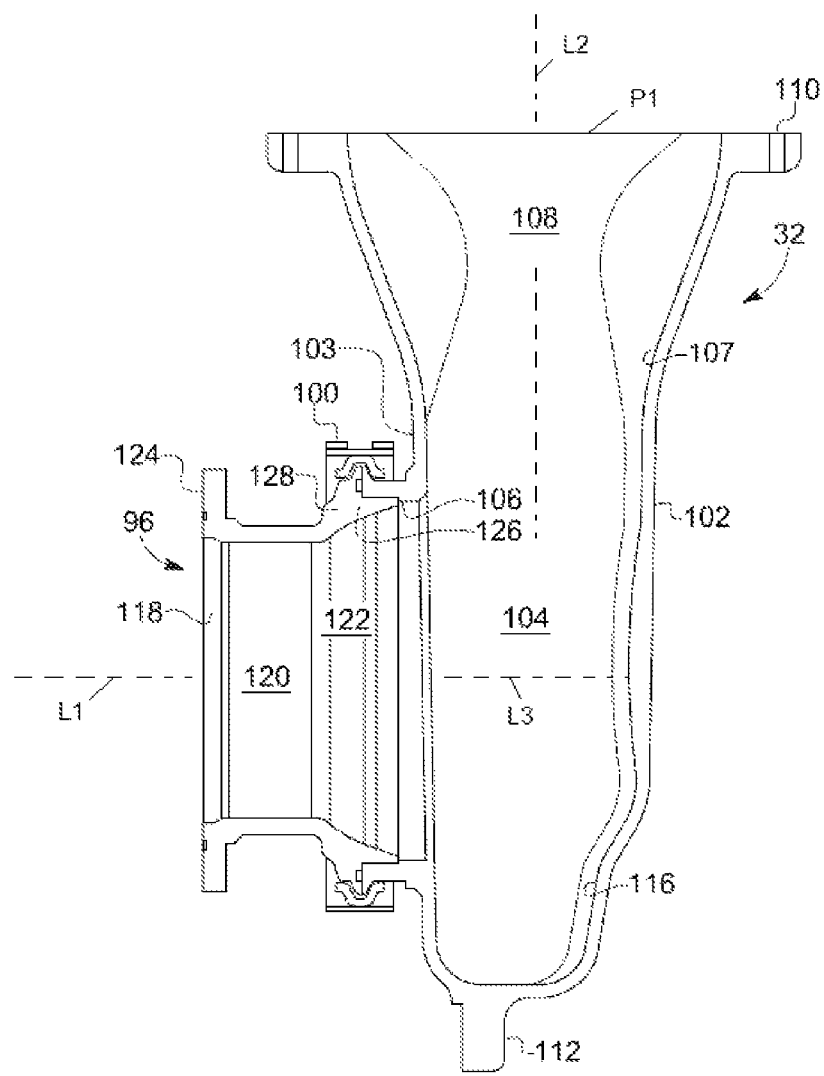
Figure 8A:
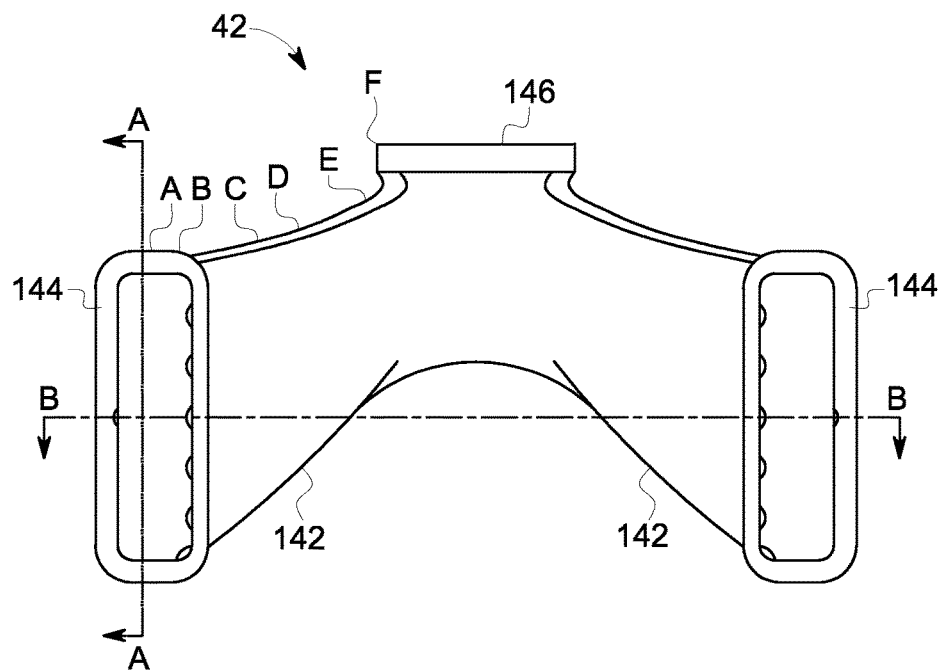
Figure 8B:
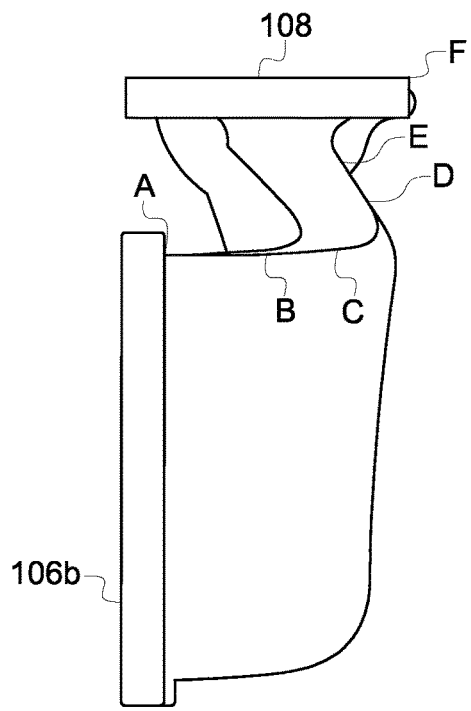
Figures 8C, 9:
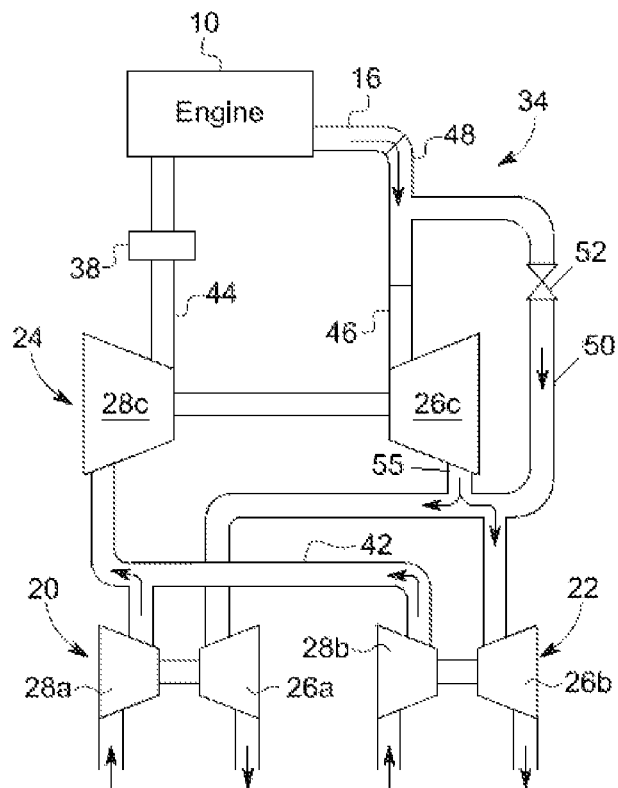

FIG. 4, comprising views 4A-4C, shows a turbine interstage duct of the two stage turbocharger arrangement;

FIG. 5, comprising views 5A-5B, shows a flow splitter component of the turbine interstage duct shown in FIG. 4;

FIG. 6 shows in perspective view a low pressure turbocharger and an exhaust casing of the two stage turbocharger arrangement;

FIG. 7 shows in side section view the exhaust casing of FIG. 6;

FIG. 8 shows views 8A-8B and a dimensional table 8C of a compressor interstage duct of the two stage turbocharger arrangement; and FIG. 9 schematically illustrates a flow arrangement of a two-stage turbocharger, according to embodiments.

DETAILED DESCRIPTION

Reference will be made below in detail to exemplary embodiments of the invention, examples of which are illustrated in the accompanying drawings. Wherever possible, the same reference characters used throughout the drawings refer to the same or like parts.

Aspects of the invention relate to diesel engines (e.g., marine diesel engines). Particular aspects of the invention relate to components provided for connection of turbochargers to such engines. In certain aspects, the invention includes a two-stage turbocharger arrangement including two low pressure (LP) turbochargers and a high pressure (HP) turbocharger.

Figure 1:
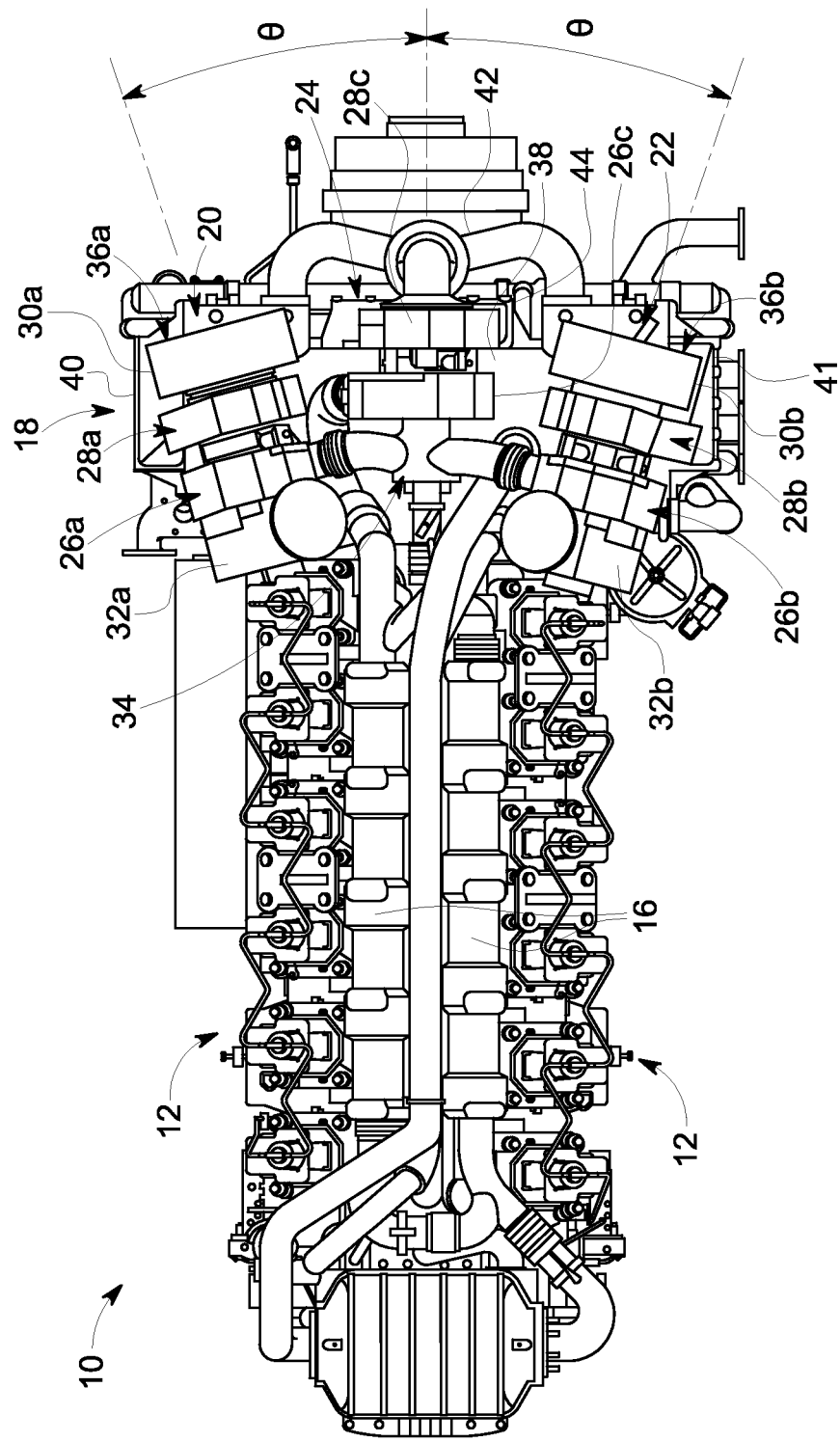
FIG. 1 shows in plan view a marine diesel engine including a two stage turbocharger arrangement.
Figure 2:
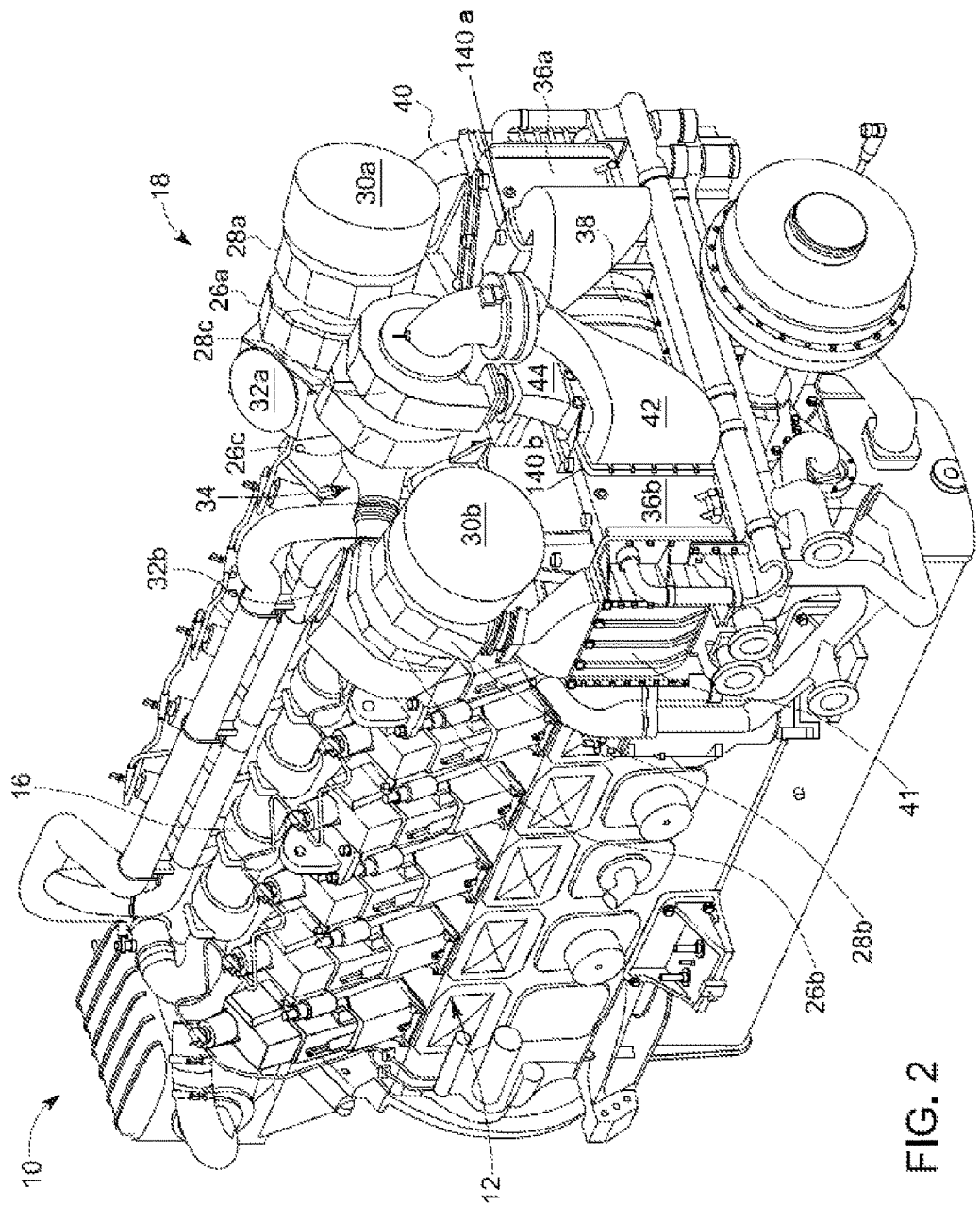
FIG. 2 shows in perspective view the marine diesel engine of FIG. 1.

FIGS. 1 and 2 show plan and perspective views of a diesel engine 10 (e.g., a marine diesel engine), which includes banks of cylinders 12. Each bank of cylinders receives intake air from an intake manifold (not shown) and discharges exhaust gases to an exhaust manifold 16. The intake manifold receives intake air that is charged to greater than atmospheric pressure by a two-stage turbocharger arrangement 18. The turbocharger arrangement 18 is driven by exhaust gas from the exhaust manifolds 16.

The turbocharger arrangement 18 includes first and second low pressure (LP) turbochargers 20, 22 as well as a high pressure (HP) turbocharger 24. Thus, the turbocharger arrangement 18 is a two-stage arrangement, with the LP turbochargers providing a first stage of compression and a second stage of expansion, and the HP turbocharger providing a second stage of compression and a first stage of expansion. "High pressure" and "low pressure," as used herein, refer to relative pressure levels at which the turbochargers operate, that is, the low pressure turbochargers operate at a lower pressure than the high pressure turbocharger, which operates at a higher pressure than the low pressure turbochargers. Each of the turbochargers 20, 22, 24 includes a respective turbine 26 (26a, 26b, 26c), which works on expansion of the exhaust gases, and a respective compressor 28 (28a, 28b, 28c), which works on compression of the intake air. That is, the respective turbine and compressor of each turbocharger are interconnected by a turbocharger shaft. The turbine is driven by exhaust gas, which causes the compressor to rotate for compressing intake air. The two LP turbochargers 20, 22 also include respective intake filters 30a, 30b and exhaust covers 32a, 32b. In operation, the turbines 26a, 26b, 26c receive exhaust gases from the exhaust manifold 16 via an inlet/interstage duct assembly (IIDA) 34, and the compressors 28a, 28b, 28c discharge intake air to the intake manifolds 14 via intercoolers 36a, 36b and an aftercooler 38. Intake air is communicated from each LP turbocharger compressor 28a, 28b to a corresponding intercooler 36a, 36b via an intercooler duct cover 40 or 41, is communicated from the intercoolers 36a, 36b to the HP compressor 28c via a compressor interstage duct 42, and is communicated from the HP compressor 28c to the aftercooler 38 via an aftercooler duct cover 44. FIG. 9 schematically illustrates a flow arrangement of the turbochargers 20, 22, 24. For reasons further discussed below, the HP turbocharger 24 is aligned in a vertical plane above a crankshaft axis of the engine 10, while the LP turbochargers 20, 22 are angled outward from the crankshaft axis at angles θ. (Angles θ are non-zero angles, greater than zero degrees and less than 90 degrees. In embodiments, the angles θ are the same. In other embodiments, the angles θ are different.)

Figure 3:
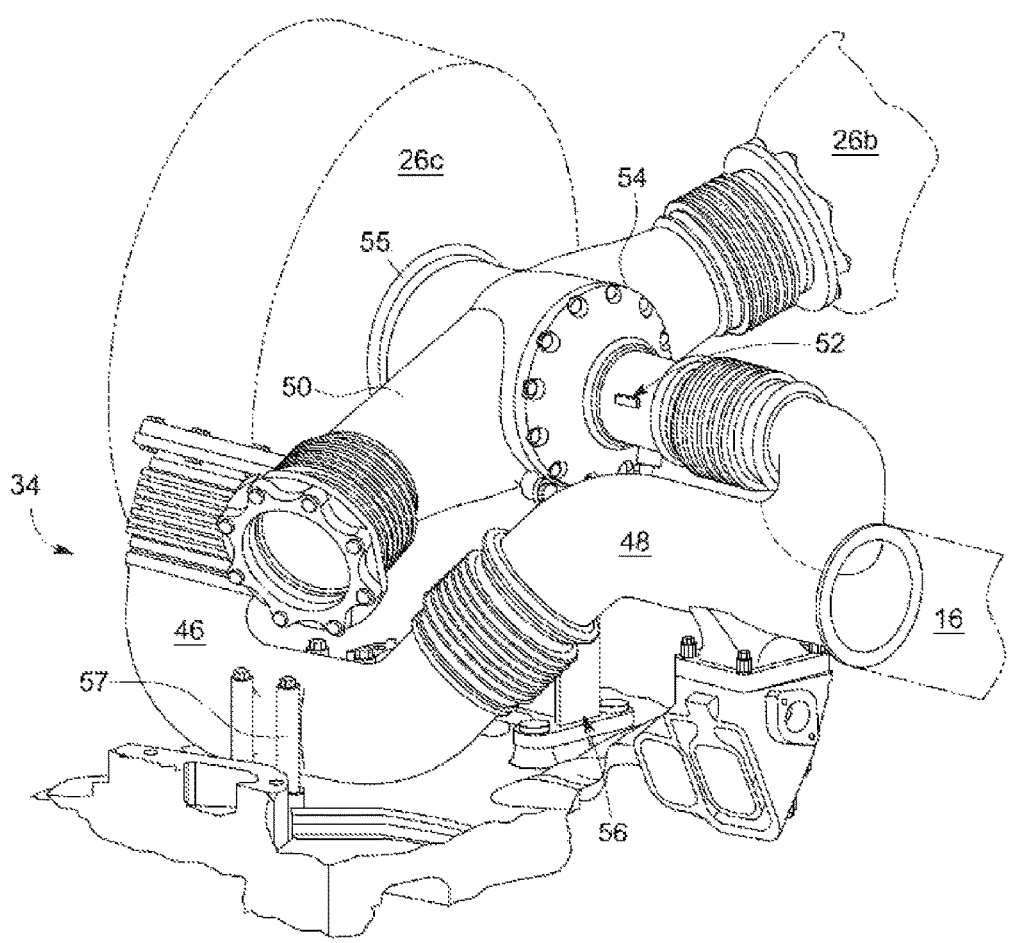
FIG. 3 shows an inlet/interstage duct assembly of the two stage turbocharger arrangement.

Referring to FIG. 3, the inlet/interstage duct assembly 34 includes a HP turbine inlet duct 46 and an inlet/bypass manifold 48 that connects the HP turbine inlet duct 46 to the exhaust manifold 16. The inlet/interstage duct assembly 34 also includes a turbine interstage duct 50 that connects the outlet 55 of the HP turbine 26c and the inlet/bypass manifold 48 to the LP turbines 26a, 26b. The inlet/bypass manifold 48 connects with the turbine interstage duct 50 via a bypass valve 52 and a generally napiform (turnip-shaped) flow splitter/ejector 54 (better shown in FIG. 5). The entire inlet/interstage duct assembly 34 is mounted onto the diesel engine 10 by an interstage duct bracket 56 and by bolts inserted through lugs 57 that are formed integrally on the HP turbine inlet duct 46.

FIG. 4, comprising views 4A-4C, shows that the turbine interstage duct 50 includes a cruciform tube 64, which has a first inlet leg 66 and a second inlet leg 68. The first inlet leg 66 extends to a first flanged opening 67, which is configured for connection of the HP turbine outlet 55. The second inlet leg 68 extends to a second flanged opening 69, which is configured for connection of the inlet/bypass manifold 48 via the flow splitter 54 (see FIG. 5). The second flanged opening 69 includes a lug 70 for mounting the turbine interstage duct 50 to the bracket 56, as shown in FIG. 3. The cruciform tube 64 also includes a first outlet leg 72 and a second outlet leg 74 that extend outward from the common junction of the inlet legs 66, 68. The outlet legs 72, 74 extend generally orthogonal to the inlet legs 66, 68, but are angled with respect to each other. Each outlet leg 72 or 74 extends to a bellows 76 or 78, which is configured for connection to one of the low pressure turbine 26a or 26b inlets.

Referring to FIG. 5, the flow splitter 54 includes a generally napiform plug 80 formed between a neck 82 and a hyperboloid tip 84. The neck 82 is configured for insertion into the second flanged opening 69, such that the hyperboloid tip 84 will be held coaxial with the first inlet leg 66 of the cruciform tube 64. The hyperboloid tip 84 is hyperbolically convex, such that when the neck 82 is inserted into the second flanged opening 69, a first flow of exhaust gas impacting onto the hyperboloid tip 84 from the first inlet leg 66 will be re-directed in first and second portions substantially equally toward either of the two outlet legs 72, 74. The neck 82 and the plug 80 enclose a branched passage 86, which splits around a hollow body 88 of the hyperboloid tip 84 to open at first and second orifices 90a, 90b disposed at either side of the hyperboloid tip 84. Thus, when the flow splitter 54 is inserted into the second flanged opening 69 of the turbine interstage duct 50, and a second flow of exhaust gas is provided from the inlet/bypass manifold 48 into the branched passage 86, the first orifice 90a is oriented to direct a first part of the second flow of exhaust gas into a first high velocity stream along the first outlet leg 72, while the second orifice 90b is oriented to direct a second part of the second flow of exhaust gas, substantially equal to the first part, in a second high velocity stream along the second outlet leg 74. By "high velocity" it is meant that the first and second streams are of higher velocity than the first flow of exhaust gas provided from the first inlet leg 66 (in at least one mode of operation of the engine system), such that the first and second streams from the orifices 90a, 90b can entrain respective first and second portions of the first flow of exhaust gas from the first inlet leg 66.

In operation, exhaust gas flows from the exhaust manifold 16 into the inlet/bypass manifold 48. A first portion of the exhaust gas continues through the HP turbine inlet duct 46 and then through the HP turbine 26c into the turbine interstage duct 50 and onto the flow splitter 54. A second portion of the exhaust gas may flow through the bypass valve 52 and the flow splitter 54 into the turbine interstage duct 50. The bypass valve 52 can be adjusted through a range of positions. In a first position of the bypass valve 52 (e.g., fully closed position), all of the exhaust gas flows direct to the HP turbine 26c and there is no bypass flow. In a second position of the bypass valve 52 (e.g., partially open or fully open position), a first (direct) portion of the exhaust gas flows to the HP turbine 26c while a second (bypass) portion of the exhaust gas flows through the flow splitter 54 to the turbine interstage duct 50. For an example, in a 16-cylinder V-configured engine, the direct flow may be at approximately 6.4 kg/s while the bypass flow may be at approximately 1 kg/s. Thus, in this example, each of the LP turbines 26a, 26b receives approximately 3.7 kg/s exhaust gas flow, with one of the LP turbines receiving 3.67 kg/s and the other receiving 3.73 kg/s. Thus, the controlled geometry of the flow splitter 54 and of the turbine interstage duct 50 allows for substantially equal flow distribution from the HP turbine 26c to each of the LP turbines 26a, 26b. Here, "substantially equal" means equal within no more than 10%.

Thus, from the turbine interstage duct 50, the exhaust gas flows through the LP turbines 26a, 26b. Referring to FIG. 6, each LP turbine 26 has an outlet 92, which is connected to an exhaust stack 94 via an inlet nozzle 96, an exhaust casing 32 (32a or 32b), and a bellows 98. The exhaust casing 32 has a generally flattened aspect such that its minor dimension is along the axis of the inlet nozzle 96. This arrangement is developed to optimize package space. The inlet nozzle 96 and the exhaust casing 32 are configured such that, in use, exhaust gas enters the inlet nozzle 96 from the turbine outlet 92 at a first velocity and a first density along the axis of the inlet nozzle 96, and exits the exhaust casing 32 at a second density and a second velocity lower than the first along the axis of the exhaust stack 94, generally orthogonal to the axis of the inlet nozzle. In embodiments, the exhaust stack is a "Y"-duct that comprises first and second exhaust stack legs, which define separate interior passages. The first and second exhaust stack legs are attached to (e.g. integral with) a junction section, where the separate interior passages meet at a common passage or space. The exhaust stack legs are configured for coupling to the bellows or, in embodiments, directly to the exhaust casings.

It is noted that although FIG. 1 shows the exhaust casings 32a, 32b, the bellows and exhaust stack are removed for clarity of illustration. From the perspective of FIG. 1, the bellows would be attached to the circular areas pointed at by the labels "32a" and "32b" in FIG. 1, and the exhaust stack would in turn be connected to the bellows, extending generally upwards as shown in FIG. 6. (In embodiments, the exhaust casings are connected directly to the exhaust stack, with the function of the bellows (e.g., duct extension and/or flexible coupling) being integrated in to the exhaust stack.)

FIG. 7 shows in side section view one of the exhaust casings 32, its inlet nozzle 96, and a connecting V-collar 100. The exhaust casing 32 is formed by a hollow body that includes first and second mutually opposed large walls 102, 103. The walls 102, 103 extend along two major dimensions of the exhaust casing 32 and are spaced apart along a minor dimension of the exhaust casing. The large walls 102, 103 are joined by a narrow peripheral wall to define between them a plenum 104. (The peripheral wall is not shown in FIG. 7, since it lies outside the plane of the view. However, the peripheral wall is shown in FIG. 6—see generally where reference numeral "32" is pointing.) The plenum 104 has a generally oblong cross section. In other words, as shown in FIG. 7, the exhaust casing 32 has a flattened (not cylindrical) profile. The flattened aspect of the plenum 104 makes it possible to fit the exhaust casing 32 in among other components of the turbocharger arrangement. The flattened aspect of the plenum may be defined in part by a line L3 in an interior of the plenum 104 that is perpendicular to the center axis L2 of the outlet nozzle and coaxial with the center axis L1 of the inlet nozzle, where a distance between the two mutually opposed walls 102, 103 along the line L3 is shorter (e.g., shorter by at least 20%) than a longest distance transverse/orthogonal to the line L3 that is between peripheral walls of the hollow body that interconnect the mutually opposed walls.

The large wall 103 includes an inlet port 106 that opens onto the plenum 104 along the minor dimension of the exhaust casing 32. The inlet nozzle 96 opens into the plenum 104 via the inlet port 106. At an upper end of the plenum 104, the large walls 102, 103 are joined by a neck 107, which transitions from the oblong cross section of the plenum to form a generally circular outlet nozzle 108. The outlet nozzle 108 opens from the plenum 104 along the larger major dimension of the exhaust casing 32. The outlet nozzle 108 includes a flange 110 for connection of the exhaust bellows 98. Opposite the outlet nozzle 108 is a second flange 112 for attachment of a bracket 114 (shown in FIG. 6), which supports the exhaust casing 32 on the engine 10. Near the second flange 112, the exhaust casing 32 includes an indentation 116. The indentation 116 permits tool access to adjoining components for maintenance and repair.

The inlet nozzle 96 includes a converging portion 118, a throat 120 of substantially constant cross-sectional area, and a diverging portion 122. Around the converging portion 118 is a flange 124 for connecting the inlet nozzle 96 to the turbine outlet 92. Around the diverging portion 122 is a lip 126 for insertion into the inlet port 106 of the exhaust casing 32. Outside the lip 126 is a rim 128, which is clamped by the V-collar 100 against the inlet port 106 of the exhaust casing 32.

In embodiments, a center axis L1 of the inlet nozzle 96 is generally perpendicular (perpendicular plus or minus five degrees) to a center axis L2 of the outlet nozzle 108. This provides a compact exhaust package, and facilitates a change in exhaust velocity, as discussed above. In other embodiments, additionally or alternatively, an egress of the outlet nozzle 108 is circular, in a plane P2 defined by the egress that is perpendicular to the center axis L2 of the outlet nozzle 108.

Referring back to FIG. 1, at the other side of the turbocharger arrangement 18 are the compressors 28a, 28b, 28c. The LP compressors 28a, 28b take suction on ambient air through their intake filters 30a, 30b, and discharge first and second flows of partly pressurized air into the intercooler duct covers 40, 41. From the duct covers 40, 41 the partly pressurized air flows through the intercoolers 36a, 36b toward the engine centerline, then forward into the compressor interstage duct 42, which combines the first and second forward flows into a single upward moving mass of air. The HP compressor 28c takes suction on the compressor interstage duct 42, and discharges fully pressurized (turbocharged) air downward through the aftercooler cover 44 into the aftercooler 38. From the aftercooler 38, the turbocharged intake air moves into the intake manifold (not shown) on which the engine cylinders 12 take suction.

FIG. 8, comprising views 8A and 8B as well as table 8C, shows that the compressor interstage duct 42 includes first and second hollow legs 142a, 142b that respectively connect with first and second interstage plenums 140a, 140b (see FIG. 2) via first and second inlets 144a, 144b. Charge air enters each interstage plenum 140a, 140b as a filtered flow from the associated intercooler 36a, 36b. From the inlets 144a, 144b, the hollow legs 142a, 142b first extend in parallel along a first direction in a first plane, then bend toward each other within the first plane, then bend away from the first plane while continue to approach each other in a second plane perpendicular to the first plane, then join to form a body of the duct 42 that encloses an outlet chamber 146. As shown in the table in FIG. 8C, the flow area within each hollow leg 142 continually diminishes from the inlet 144 to the outlet chamber 146. For example, at each inlet (station "A" of FIGS. 8A-8C) the flow area is 73,056 mm². Halfway through each arm (station "C") the flow area has diminished to 49,668 mm², and just before the outlet chamber 146 (station "E") the flow area of each arm has diminished to 24,050 mm². Thus, the compressor interstage duct 42 provides continuous converging cross section for continually accelerating the intake air from the inlets 144a, 144b to the outlet chamber 146. Such constant acceleration minimizes back pressure that could otherwise be caused by turbulent or swirling flow. Additionally, this constant converging geometry minimizes secondary flow creation, where "secondary flows" are flows that can be resolved into stream flow and cross flow components. Thus, the constantly converging cross section delivers air to the HP compressor $28c$ with minimum pressure loss.

It will be appreciated that, in embodiments of the invention, an engine (e.g., a marine diesel engine) has an exhaust manifold and an intake manifold, and has a turbocharger apparatus connected between the exhaust manifold and the intake manifold. The turbocharger apparatus includes a high pressure turbocharger, a first low pressure turbocharger, and a second low pressure turbocharger. The high pressure turbocharger is configured to receive exhaust gas from the exhaust manifold and to discharge pressurized intake air ("charge air") to the intake manifold. Each low pressure turbocharger includes a compressor configured to receive ambient air and to discharge partly pressurized air (i.e., air pressurized above ambient but to less than charge air pressure) into the high pressure turbocharger via a compressor interstage duct, and each including a turbine inlet configured to receive exhaust gas from the high pressure turbocharger via a turbine interstage duct and to release exhaust gas to an associated exhaust casing. In certain embodiments, a rotational axis of the high pressure turbocharger extends generally parallel a crankshaft axis of the engine, while rotational axes of the first and second low pressure turbochargers are angled toward the rotational axis of the high pressure turbocharger in a plane parallel the crankshaft axis of the engine.

In embodiments, a turbine exhaust casing includes a hollow body that has two mutually opposed walls, which extend along first and second major dimensions of the hollow body and are spaced apart along a minor dimension of the hollow body. The hollow body defines a plenum. The exhaust casing also includes an inlet nozzle opening into the plenum along the minor dimension of the hollow body, and an outlet nozzle opening from the plenum along one of the major dimensions of the hollow body. The inlet nozzle includes a throat of substantially constant diameter, and includes a diverging portion that opens from the throat into the plenum. The inlet nozzle may be clamped by a collar to the hollow body.

In embodiments, a compressor interstage duct is provided for combining flows of partly pressurized air. The duct includes a body defining an outlet chamber, a first leg defining a first passage opening into the outlet chamber from a first inlet, and a second leg defining a second passage opening into the outlet chamber from a second inlet. The first and second inlets have a combined flow area that is greater than a flow area of the outlet chamber. The first and second legs have flow areas that gradually diminish from the first inlet and the second inlet, respectively, to where the legs merge to form the body and open into the outlet chamber. In embodiments, the legs have substantially the same flow area as one another at each of a plurality of stations along the legs. Each of the legs includes a first portion that extends in a first direction along the central axis of its respective inlet, a second portion that extends orthogonally from the first portion toward the second portion of the other leg, and a third portion that merges with the third portion of the other leg. Thus, each of the legs extends from its respective inlet in a first plane parallel to the other leg, curves toward the other leg in the first plane, and bends away from the first plane and joins with the other leg to form the body defining the outlet chamber. The legs and the body may be formed as an integral piece. The third portions of the legs may be joined by an arch.

In embodiments, a turbine interstage duct is provided for connecting a high pressure turbine bypass to a high pressure turbine outlet and to first and second low pressure turbine inlets. The turbine interstage duct includes a cruciform tube, which has mutually opposed first and second inlet legs and mutually opposed first and second outlet legs that extend outward from a common junction to separate openings. The outlet legs extend generally orthogonal to the inlet legs. The opening of the first inlet leg is configured for connection to a high pressure turbine outlet. The opening of the second inlet leg is generally coaxial with the first inlet leg, and is configured for receiving a flow splitter. The opening of the first outlet leg is configured for connection to a first low pressure turbine inlet, and the opening of the second outlet leg is configured for connection to a second low pressure turbine inlet. In certain embodiments, the turbine interstage duct also includes a flow splitter configured for insertion into the opening of the second inlet leg of the cruciform tube, to be arranged coaxial with the first inlet leg. The flow splitter includes a generally napiform body to be arranged protruding from the second inlet leg into the common junction of the cruciform tube, with a hyperboloid tip of the napiform body pointing along the axis of the first inlet leg for splitting a first gas flow from the first inlet leg into first and second portions respectively directed toward the first and second outlet legs. The body of the flow splitter defines a branched passage with a first opening toward the second inlet leg and with second and third openings toward the first and second outlet legs, such that a gas flow from the second inlet leg into the branched passage will be split into a first high velocity stream directed along the first outlet leg and into a second high velocity stream directed along the second outlet leg (the "high velocity" streams being of higher velocity than the first and second portions of the first gas flow), such that the first and second high velocity streams entrain first and second portions of the first gas flow.

Another embodiment relates to a system comprising an engine, a first turbocharger, a second turbocharger, a first exhaust casing, a second exhaust casing, and an exhaust stack. The first turbocharger is operably coupled to the engine and comprises a first turbine and a first compressor. The first turbine has a first turbine exhaust. The second turbocharger is operably coupled to the engine and comprises a second turbine and a second compressor. The second turbine has a second turbine exhaust. The first exhaust casing comprises a first hollow body that has two mutually opposed first walls, which extend along first and second major dimensions of the first hollow body and are spaced apart along a minor dimension of the first hollow body. The first hollow body defines a first plenum. The first exhaust casing further comprises a first inlet nozzle opening into the first plenum along the minor dimension of the first hollow body. The first inlet nozzle is attached to the first turbine exhaust of the first turbocharger. The first exhaust casing further comprises a first outlet nozzle opening from the first plenum along one of the major dimensions of the first hollow body. The second exhaust casing comprises a second hollow body that has two mutually opposed second walls, which extend along first and second major dimensions of the second hollow body and are spaced apart along a minor dimension of the second hollow body. The second hollow body defines a second plenum. The second exhaust casing further comprises a second inlet nozzle opening into the second plenum along the minor dimension of the second hollow body. The second inlet nozzle is attached to the second turbine exhaust of the second turbocharger. The second exhaust casing further comprises a second outlet nozzle opening from the second plenum along one of the major dimensions of the second hollow body. The exhaust stack comprises a Y-duct with first and second exhaust stack legs. The first exhaust stack leg is coupled to the first outlet nozzle of the first exhaust casing and the second exhaust stack leg is coupled to the second outlet nozzle of the second exhaust casing. In operation, the exhaust stack merges exhaust flows exiting the first exhaust casing and the second exhaust cases into a common flow.

In another embodiment, a system comprises an engine, a high pressure turbocharger operably coupled to the engine and comprising a high pressure turbine and a high pressure compressor, a first low pressure turbocharger operably coupled to the high pressure turbocharger and comprising a first low pressure turbine and a first low pressure compressor, and a second low pressure turbocharger operably coupled to the high pressure turbocharger and comprising a second low pressure turbine and a second low pressure compressor. (Operable coupling may include interconnecting the turbochargers as shown in FIG. 9, for example.) The system further comprises a turbine interstage duct. The turbine interstage duct comprises a cruciform tube having mutually opposed first and second inlet legs and mutually opposed first and second outlet legs that extend outward from a common junction to separate openings. The outlet legs extend generally orthogonal to the inlet legs. The opening of the first inlet leg is connected to an outlet of the high pressure turbine. The opening of the second inlet leg is generally coaxial with the first inlet leg; a flow splitter is received in the opening of the second inlet leg. The opening of the first outlet leg is connected to an inlet of the first low pressure turbine. The opening of the second outlet leg is connected to an inlet of the second low pressure turbine. The second inlet leg is fluidly coupled, through the flow splitter, with a bypass valve that is controllable to control a bypass flow of exhaust from the engine that bypasses the high pressure turbine and flows directly into the turbine interstage duct for being split by the flow splitter and routed to the first and second low pressure turbines.

In an embodiment, a system includes an engine, a first turbocharger operably coupled to the engine and comprising a first turbine and a first compressor, the first turbine having a first turbine exhaust, a second turbocharger operably coupled to the engine and comprising a second turbine and a second compressor, the second turbine having a second turbine exhaust. The system further includes a first exhaust casing in which the inlet nozzle of the first exhaust casing is attached to the first turbine exhaust and a second exhaust casing in which the inlet nozzle of the second exhaust casing is attached to the second turbine exhaust. The system also includes an exhaust stack comprising a Y-duct with first and second exhaust stack legs, wherein the first exhaust stack leg is coupled to the outlet nozzle of the first exhaust casing and the second exhaust stack leg is coupled to the outlet nozzle of the second exhaust casing, whereby in operation the exhaust stack merges exhaust flows exiting the first exhaust casing and the second exhaust cases into a common flow.

In another embodiment, a turbine interstage duct includes a cruciform tube having mutually opposed first and second inlet legs and mutually opposed first and second outlet legs that extend outward from a common junction to separate openings, the outlet legs extending generally orthogonal to the inlet legs, the opening of the first inlet leg being configured for connection to a high pressure turbine outlet, the opening of the second inlet leg being generally coaxial with the first inlet leg and configured for receiving a flow splitter, the opening of the first outlet leg being configured for connection to a first low pressure turbine inlet, and the opening of the second outlet leg being configured for connection to a second low pressure turbine inlet.

In embodiments, the turbine interstage duct may further include a flow splitter configured for insertion into the opening of the second inlet leg of the cruciform tube, to be arranged coaxial with the first inlet leg, the flow splitter including a generally napiform body to be arranged protruding from the second inlet leg into the common junction of the cruciform tube, with a hyperboloid tip of the napiform body pointing along the axis of the first inlet leg for splitting a first gas flow from the first inlet leg into first and second portions respectively directed toward the first and second outlet legs.

In certain embodiments, the turbine interstage duct may include a flow splitter body that defines a branched passage with a first opening toward the second inlet leg for receiving a second gas flow and with second and third openings toward the first and second outlet legs, such that the second gas flow from the second inlet leg into the branched passage will be split into a first high velocity stream directed along the first outlet leg and into a second high velocity stream directed along the second outlet leg, the first and second high velocity streams for entraining the respective first and second portions of the first gas flow.

In yet other embodiments, a system includes an engine, a high pressure turbocharger operably coupled to the engine and comprising a high pressure turbine and a high pressure compressor, a first low pressure turbocharger operably coupled to the high pressure turbocharger and comprising a first low pressure turbine and a first low pressure compressor, and a second low pressure turbocharger operably coupled to the high pressure turbocharger and comprising a second low pressure turbine and a second low pressure compressor. The system further includes a turbine interstage duct in which the opening of the first outlet leg is connected to an inlet of the first low pressure turbine; the opening of the second outlet leg is connected to an inlet of the second low pressure turbine; the opening of the first inlet leg is connected to an outlet of the high pressure turbine. The turbine interstage duct further includes a flow splitter received in the opening of the second inlet leg, and the second inlet leg is fluidly coupled, through the flow splitter, with a bypass valve that is controllable to control a bypass flow of exhaust from the engine that bypasses the high pressure turbine and flows directly into the turbine interstage duct for being split by the flow splitter and routed to the first and second low pressure turbines.

In another embodiment, a compressor interstage duct for combining air flows comprises a body defining an outlet chamber, a first leg defining a first passage opening into the outlet chamber from a first inlet, and a second leg defining a second passage opening into the outlet chamber from a second inlet. The first and second inlets have a combined flow area that is greater than a flow area of the outlet chamber, the first and second legs having flow areas that gradually diminish from the first inlet and the second inlet, respectively, to where the legs merge to form the body and open into the outlet chamber.

In another embodiment, a compressor interstage duct for combining air flows comprises a body defining an outlet chamber, a first leg defining a first passage opening into the outlet chamber from a first inlet, and a second leg defining a second passage opening into the outlet chamber from a second inlet. The first and second inlets have a combined flow area that is greater than a flow area of the outlet chamber, the first and second legs having flow areas that gradually diminish from the first inlet and the second inlet, respectively, to where the legs merge to form the body and open into the outlet chamber. Each of the legs includes a first portion that extends in a first direction along the central axis of its respective inlet, a second portion that extends orthogonally from the first portion toward the second portion of the other leg, and a third portion that merges with the third portion of the other leg. The third portions of the legs are joined by an arch.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described embodiments, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An engine comprising:
   an exhaust manifold and an intake manifold; and
   a turbocharger apparatus connected between the exhaust manifold and the intake manifold, the turbocharger apparatus comprising:
      a high pressure turbocharger including a turbine configured to receive high pressure exhaust gas from the exhaust manifold and including a compressor configured to discharge high pressure intake air to the intake manifold; and
      first and second low pressure turbochargers, each including a compressor configured to receive ambient air and to discharge low pressure air into the high pressure turbocharger via a compressor interstage duct, and each including a turbine configured to receive low pressure exhaust gas from the high pressure turbocharger via a turbine interstage duct and to release exhaust gas to a respective exhaust casing;
   wherein each exhaust casing includes:
      a hollow body that has two mutually opposed walls, which extend along first and second major dimensions of the hollow body in respective first and second planes, and which and are spaced apart along a minor dimension of the hollow body, the hollow body defining a plenum;
      an inlet nozzle opening into the plenum along the minor dimension of the hollow body, an opening of the inlet nozzle defining a third plane; and
      an outlet nozzle opening from the plenum along one of the major dimensions of the hollow body;
      wherein the third plane defined by the inlet nozzle opening is parallel to at least one of the first plane and the second plane; and
   wherein the compressor interstage duct comprises:
      a body defining an outlet chamber;
      a first leg defining a first passage opening into the outlet chamber from a first inlet; and
      a second leg defining a second passage opening into the outlet chamber from a second inlet,
      wherein the first and second inlets have a combined flow area that is greater than a flow area of the outlet chamber, the first and second legs having flow areas that gradually diminish from the first inlet and the second inlet, respectively, to where the legs open into the outlet chamber.

2. The engine of claim 1, wherein the inlet nozzle of each exhaust casing respectively includes a throat of constant diameter, and including a diverging portion that opens from the throat into the plenum.

3. The engine of claim 1, further comprising a respective collar clamping the inlet nozzle of each exhaust casing to the hollow body.

4. The engine of claim 1, wherein a center axis of the inlet nozzle of each exhaust casing is perpendicular to a center axis of the outlet nozzle.

5. The engine of claim 4, wherein an egress of the outlet nozzle is circular, in a plane defined by the egress that is perpendicular to the center axis of the outlet nozzle.

6. The engine of claim 4, wherein along a line in an interior of the plenum that is perpendicular to the center axis of the outlet nozzle and coaxial with the center axis of the inlet nozzle, a distance between the two mutually opposed walls is shorter than a distance transverse to the line that is between peripheral walls of the hollow body that interconnect the mutually opposed walls.

7. The engine of claim 1, wherein the legs of the compressor interstage duct have the same flow area as one another at each of a plurality of stations along the legs.

8. The engine of claim 7, wherein each of the legs of the compressor interstage duct extends from its respective inlet in a plane of the compressor interstage duct parallel to the other of the first or the second leg, curves toward the other of the first or the second leg in the plane of the compressor interstage duct, then bends away from the plane of the compressor interstage duct and joins with the other of the first or the second leg to form the body defining the outlet chamber.

9. The engine of claim 7, wherein the legs and the body of the compressor interstage duct are formed as an integral piece.

10. The engine of claim 7, wherein each of the legs of the compressor interstage duct includes a first portion that extends in a first direction along the central axis of its respective inlet, a second portion that extends orthogonally from the first portion toward the second portion of the other of the first or the second leg, and a third portion that merges with the third portion of the other of the first or the second leg.

11. The engine of claim 1, wherein a rotational axis of the high pressure turbocharger extends parallel to a crankshaft axis of the engine, while rotational axes of the first and second low pressure turbochargers are angled at at least one non-zero angle toward the rotational axis of the high pressure turbocharger in a plane parallel the crankshaft axis of the engine.

12. The engine of claim 1, wherein each of the legs extends from its respective inlet in a first horizontal direction, curves toward the other of the first or the second leg in a horizontal plane, and bends upward to open into the outlet chamber adjacent the other of the first or the second leg.

13. An engine comprising:
an exhaust manifold and an intake manifold; and
a turbocharger apparatus connected between the exhaust manifold and the intake manifold, the turbocharger apparatus comprising:
  a high pressure turbocharger including a turbine configured to receive high pressure exhaust gas from the exhaust manifold and including a compressor configured to discharge high pressure intake air to the intake manifold; and
  first and second low pressure turbochargers, each including a compressor configured to receive ambient air and to discharge low pressure air into the high pressure turbocharger via a compressor interstage duct, and each including a turbine configured to receive low pressure exhaust gas from the high pressure turbocharger via a turbine interstage duct and to release exhaust gas to a respective exhaust casing;
wherein each exhaust casing includes:
  a hollow body that has two mutually opposed walls, which extend along first and second major dimensions of the hollow body in respective first and second planes, and which and are spaced apart along a minor dimension of the hollow body, the hollow body defining a plenum;
  an inlet nozzle opening into the plenum along the minor dimension of the hollow body, an opening of the inlet nozzle defining a third plane; and
  an outlet nozzle opening from the plenum along one of the major dimensions of the hollow body;
  wherein the third plane defined by the inlet nozzle opening is parallel to at least one of the first plane and the second plane; and
wherein the turbine interstage duct comprises:
  a cruciform tube having mutually opposed first and second inlet legs and mutually opposed first and second outlet legs that extend outward from a common junction to separate openings, the outlet legs extending orthogonal to the inlet legs, the opening of the first inlet leg connected to an outlet of the high pressure turbocharger turbine, the second inlet leg being coaxial with the first inlet leg, the opening of the first outlet leg connected to an inlet of the first low pressure turbocharger turbine, and the opening of the second outlet leg connected to an inlet of the second low pressure turbocharger turbine.

14. The engine of claim 13, wherein a rotational axis of the high pressure turbocharger extends parallel to a crankshaft axis of the engine, while rotational axes of the first and second low pressure turbochargers are angled at at least one non-zero angle toward the rotational axis of the high pressure turbocharger in a plane parallel the crankshaft axis of the engine.

15. The engine of claim 13, wherein the inlet nozzle of each exhaust casing respectively includes a throat of constant diameter, and including a diverging portion that opens from the throat into the plenum.

16. The engine of claim 13, further comprising a respective collar clamping the inlet nozzle of each exhaust casing to the hollow body.

17. The engine of claim 13, wherein a center axis of the inlet nozzle of each exhaust casing is perpendicular to a center axis of the outlet nozzle.

18. An engine comprising:
an exhaust manifold and an intake manifold; and
a turbocharger apparatus connected between the exhaust manifold and the intake manifold, the turbocharger apparatus comprising:
  a high pressure turbocharger including a turbine configured to receive high pressure exhaust gas from the exhaust manifold and including a compressor configured to discharge high pressure intake air to the intake manifold; and
  first and second low pressure turbochargers, each including a compressor configured to receive ambient air and to discharge low pressure air into the high pressure turbocharger via a compressor interstage duct, and each including a turbine configured to receive low pressure exhaust gas from the high pressure turbocharger via a turbine interstage duct and to release exhaust gas to a respective exhaust casing;
wherein the turbine interstage duct comprises:
  a cruciform tube having mutually opposed first and second inlet legs and mutually opposed first and second outlet legs that extend outward from a common junction to separate openings, the outlet legs extending orthogonal to the inlet legs, the opening of the first inlet leg connected to an outlet of the high pressure turbocharger turbine, the second inlet leg being coaxial with the first inlet leg, the opening of the first outlet leg connected to an inlet of the first low pressure turbocharger turbine, and the opening of the second outlet leg connected to an inlet of the second low pressure turbocharger turbine; and a flow splitter positioned in the opening of the second inlet leg of the cruciform tube, coaxial with the first inlet leg, the flow splitter including a napiform body protruding from the second inlet leg into the common junction of the cruciform tube, with a hyperboloid tip of the napiform body pointing along the axis of the first inlet leg for splitting a first gas flow from the first inlet leg into first and second portions respectively directed toward the first and second outlet legs.

19. An engine comprising:

an exhaust manifold and an intake manifold; and a turbocharger apparatus connected between the exhaust manifold and the intake manifold, the turbocharger apparatus comprising:

a high pressure turbocharger including a turbine configured to receive high pressure exhaust gas from the exhaust manifold and including a compressor configured to discharge high pressure intake air to the intake manifold; and first and second low pressure turbochargers, each including a compressor configured to receive ambient air and to discharge low pressure air into the high pressure turbocharger via a compressor interstage duct, and each including a turbine configured to receive low pressure exhaust gas from the high pressure turbocharger via a turbine interstage duct and to release exhaust gas to a respective exhaust casing;

wherein each exhaust casing comprises:

a hollow body that has two mutually opposed large walls, which extend along first and second major dimensions of the hollow body in respective first and second planes and are spaced apart by a minor dimension of the hollow body, the hollow body defining a plenum;

an inlet nozzle opening into the plenum along the minor dimension of the hollow body, an opening of the inlet nozzle defining a third plane, wherein the third plane defined by the inlet nozzle opening is parallel to at least one of the first plane and the second plane; and an outlet nozzle opening from the plenum along one of the major dimensions of the hollow body;

wherein the compressor interstage duct comprises:

a body defining an outlet chamber;

a first leg defining a first passage opening into the outlet chamber from a first inlet; and a second leg defining a second passage opening into the outlet chamber from a second inlet, the first and second inlets having a combined flow area that is greater than a flow area of the outlet chamber, the first and second legs having flow areas that gradually diminish from the first inlet and the second inlet, respectively, to where the legs open into the outlet chamber; and wherein the turbine interstage duct comprises:

a cruciform tube having mutually opposed first and second inlet legs and mutually opposed first and second outlet legs that extend outward from a common junction to separate openings, the outlet legs extending orthogonal to the inlet legs, the opening of the first inlet leg connected to an outlet of the high pressure turbocharger turbine, the second inlet leg being coaxial with the first inlet leg, the opening of the first outlet leg connected to an inlet of the first low pressure turbocharger turbine, and the opening of the second outlet leg connected to an inlet of the second low pressure turbocharger turbine.

\* \* \* \* \*